(12) United States Patent
Barbieux

(10) Patent No.: US 6,371,493 B1
(45) Date of Patent: Apr. 16, 2002

(54) ADAPTIVE CLAMPING TYPE CHUCK

(75) Inventor: Jacques Barbieux, Louvres (FR)

(73) Assignee: Sandvik Tobler S.A., Louvres (FR)

( * ) Notice: Subject to any disclaimer, the term of this patent is extended or adjusted under 35 U.S.C. 154(b) by 0 days.

(21) Appl. No.: 09/490,111

(22) Filed: Jan. 24, 2000

(30) Foreign Application Priority Data

Jan. 25, 1999 (FR) ............................................ 99 00755

(51) Int. Cl.[7] .............................................. B23B 31/18
(52) U.S. Cl. ..................... 279/106; 279/121; 279/132
(58) Field of Search ................. 279/106, 108, 279/121, 132

(56) References Cited

U.S. PATENT DOCUMENTS

| | | | |
|---|---|---|---|
| 2,722,427 A | 11/1955 | Labeyrie | |
| 3,233,908 A | 2/1966 | Schwartzmayr et al. | |
| 5,174,179 A | 12/1992 | Hiestand | |
| 6,036,197 A | * 3/2000 | Barbieux | 279/132 |

FOREIGN PATENT DOCUMENTS

| | | |
|---|---|---|
| DE | 39 29 010 A1 | 4/1990 |
| FR | 2 083 862 | 12/1971 |
| FR | 2 373 351 | 7/1978 |

* cited by examiner

Primary Examiner—Steven C. Bishop
(74) Attorney, Agent, or Firm—Burns, Doane, Swecker & Mathis, L.L.P.

(57) ABSTRACT

The invention provides a chuck including a plurality of jaws (8), each of which is fixed to the forward end of a jaw carrier arm (5), said arm (5) being borne by a pivot joint (6) mounted on the body (1) of the chuck and the rotation of which imparts to the jaw (8) an essentially radial movement, said rotation being controlled by radially displacing a sliding member (4) pushing a truncated sphere (10) housed between said sliding member (4) and a recess provided in the arm (5) to the rear of said pivot joint (6). Furthermore, said truncated sphere (10) is capable of sliding over the plane surface of contact with the sliding member (4), said jaw carrier arm (5) then sliding in the pivot joint (6) in an essentially axial direction, while being drawn rearwards by a return spring (7).

Application to the clamping of a piece while pressing it axially against its stops.

12 Claims, 5 Drawing Sheets

ADAPTIVE CLAMPING TYPE CHUCK

The present invention relates to a device for clamping a work piece on a chuck, this device making it possible, during clamping, to hold the piece axially so that it bears against stops serving to pre-position the piece and disposed on the chuck.

Some known chucks are equipped with jaws capable of moving, in relation to the axis of the chuck, radially, but not axially. There are also known devices permitting combined radial and axial movement on the part of each jaw, so as to be able simultaneously to clamp a piece and to press it against the chuck. However, conventional chucks do not enable the radial movement of the jaw to be decoupled from its axial movement.

To effect optimum clamping, i.e. clamping the members for which are capable of holding a work piece firmly, but without being liable to damage the surface of said piece, arrangements are usually made (insofar as the profile of the piece permits) to cause the jaws to cooperate with certain suitable parts of the piece, such as grooves, recesses, shoulders or projections.

Now, the dimensions of the blanks inevitably differ to a certain extent from the design profile. In order to position the jaws on the piece so as to be able to effect optimum clamping, one then has to adjust its position in space, hence in relation to the chuck. Generally speaking, this adjustment is not confined to a simple radial translation. As a result, it is not possible to preposition a piece on a conventional chuck (by causing it to bear on reference stop means disposed for this purpose on the face of the chuck), and then, without axially displacing it, accurately mate with the profile of the piece at the time of clamping.

This is unfortunate, as industry has a real need for a chuck having this capability. This need arises, for example, when it is wished to clamp a blank on a chuck in a quite particular position which will make it possible to machine the piece so that it will run as true as possible.

The present invention solves this problem by allowing the jaws to move radially, axially, and even transversely, with a certain measure of mutual independence.

The chuck according to the invention includes a plurality of jaws, each of which is fixed to the forward end of a jaw carrier arm, said arm being borne by a pivot joint mounted on the body of the chuck and the rotation of which imparts to the jaw an essentially radial movement, said rotation being controlled by radially displacing a sliding member pushing a truncated sphere housed between said sliding member and a recess provided in the arm to the rear of said pivot joint. Furthermore, said truncated sphere is capable of sliding over the plane surface of contact with the sliding member, said jaw carrier arm then sliding in the pivot joint in an essentially axial direction, while being drawn rearwards by a return spring.

According to other, additional features, the rear portion of the jaw carrier arm moves inside a recess provided in the plate on which the chuck is mounted and the width of which is slightly greater than that of said arm, so as to confer on the arm a certain latitude of movement in the transverse direction.

Thus, the jaws can each come into contact with the work piece and adapt to its exact profile by subjecting it only to a radial translation, before proceeding to its final clamping.

Further advantages, objects and characteristics of the present invention will emerge from the following description of several forms of embodiment of the invention presented by way of example, said description being made with reference to the annexed figures, wherein.

Figure 1:
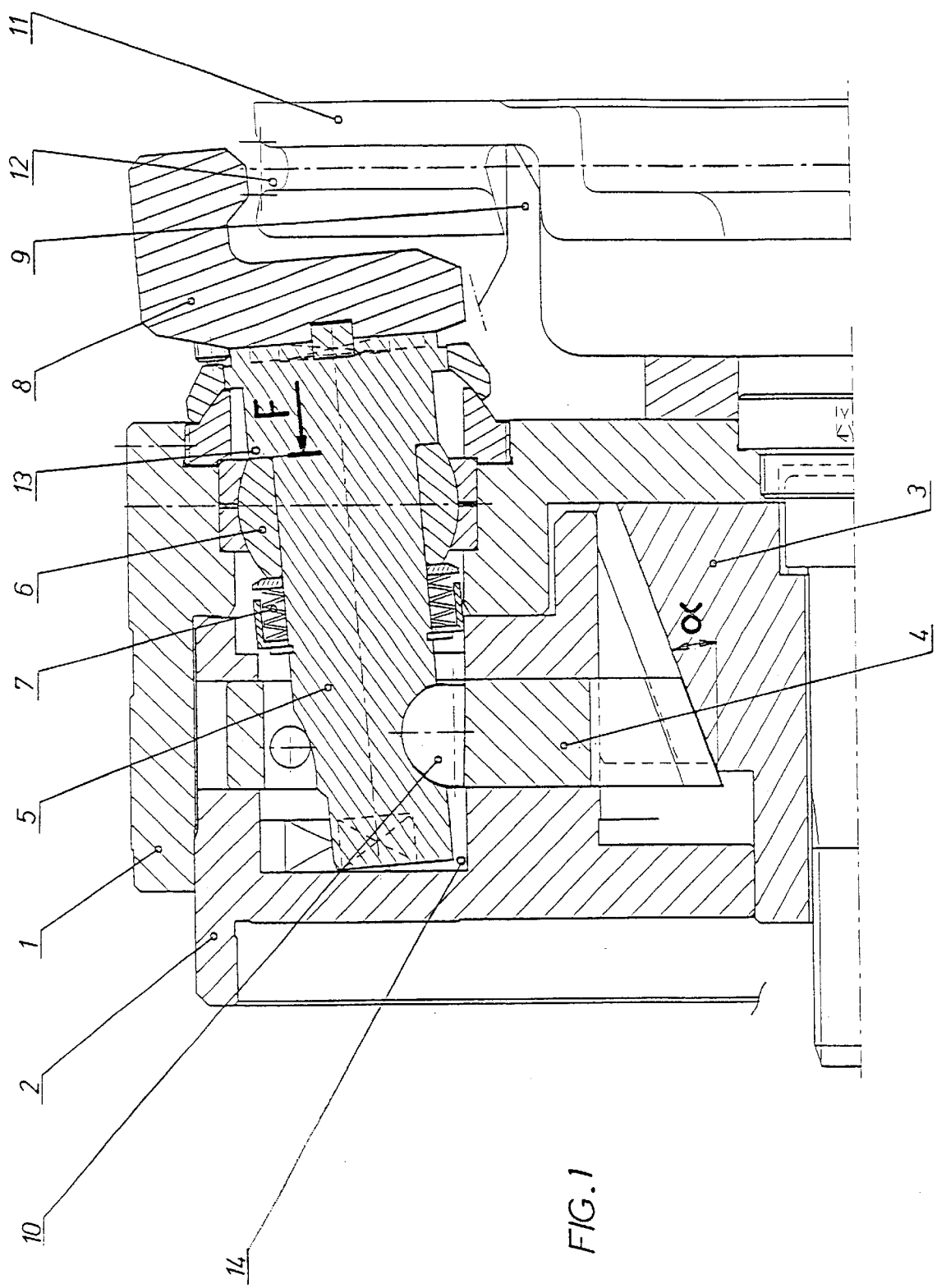
FIG. 1 is a longitudinal cross-section of a chuck according to a first form of embodiment, showing a jaw in open position and a work piece having an axially symmetrical groove.
Figure 2:
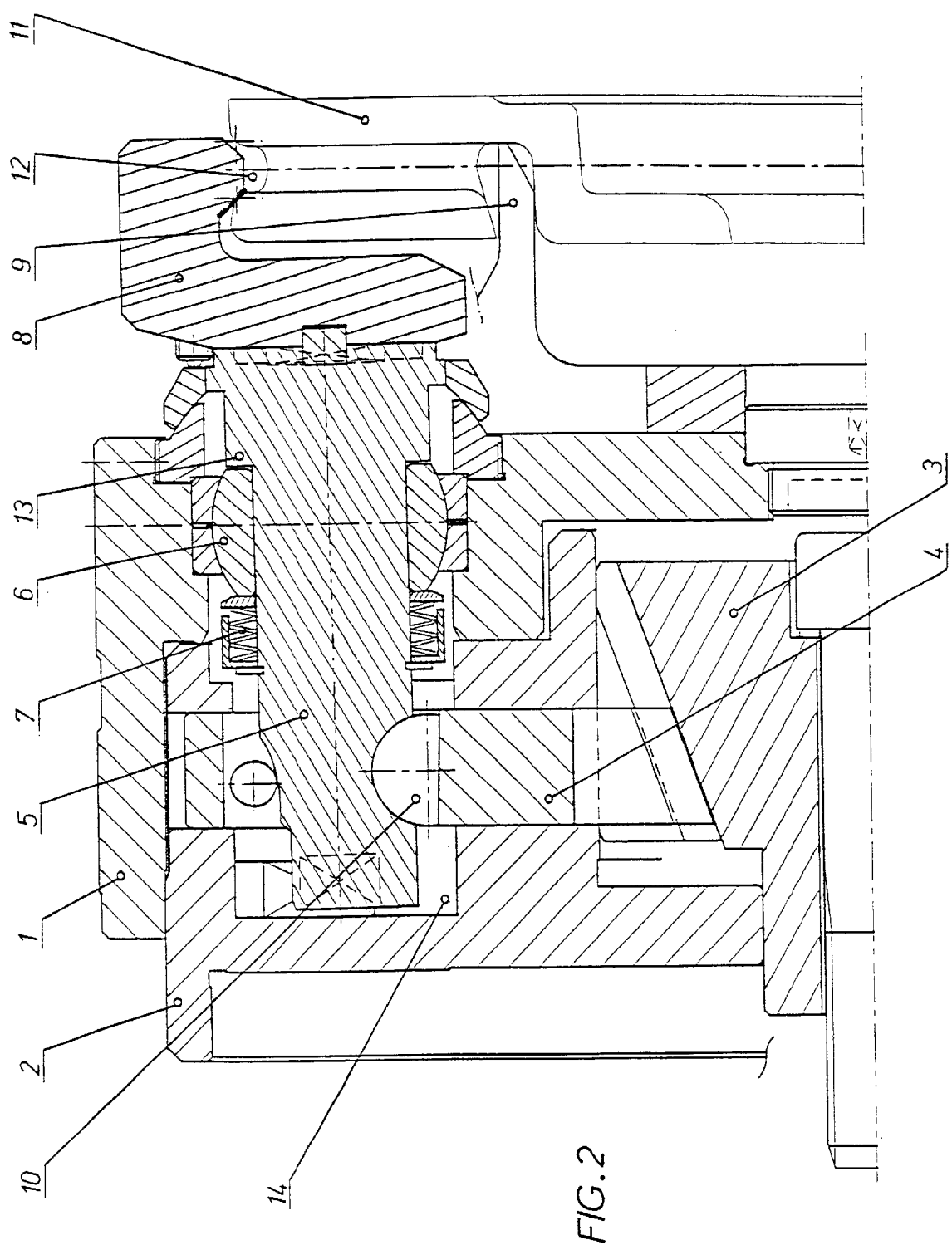
FIG. 2 is analogous to FIG. , but illustrates the phase in which said jaw comes into contact with the work piece.
Figure 3:
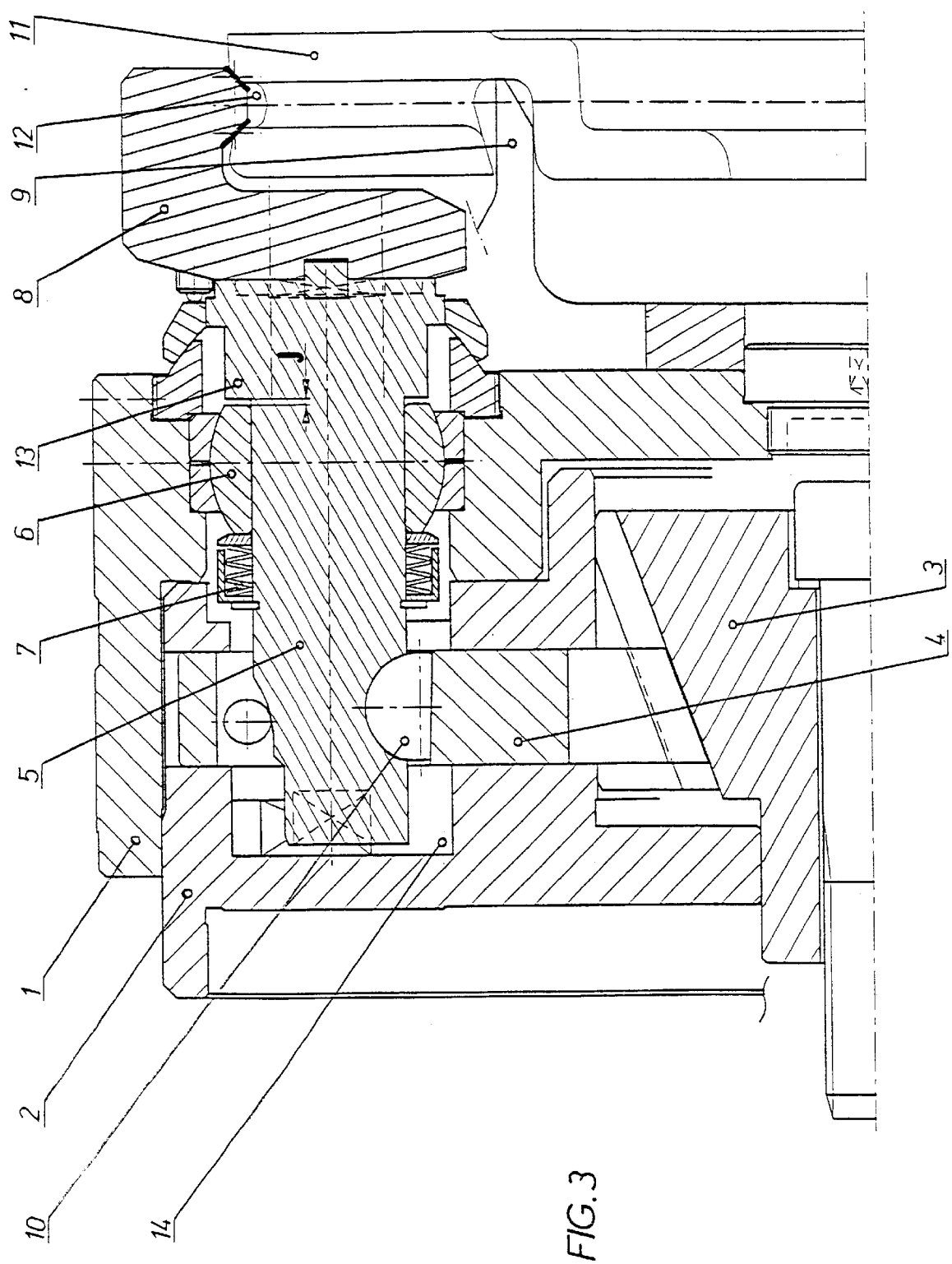
FIG. 3 is analogous to the preceding figures, but shows the jaw in its final intended position on said piece

FIGS. 1 to 3 show a chuck body 1 mounted on a plate 2. On its forward face, body 1 has reference stops on which work piece 11 bears. In the example illustrated, stop 9 has the shape of an essentially axial projection, which penetrates a corresponding recess provided in piece 11. We can also see one of jaws 8, which is fixed to the forward end of a corresponding jaw carrier arm 5. The latter is borne by a pivot joint 6 mounted in body 1 and the rotation of which imparts to jaw 8 an essentially radial movement. Furthermore, arm 5 can slide in pivot joint 6 in an essentially axial direction, while being drawn rearwards by a return spring 7.

In FIG. 1, the clamping device is in open position.

As long as the jaw has not come to bear on piece 11, a shoulder 13 of arm 5 abuts against forward face F of pivot joint 6.

To bring the jaws into contact with piece 11 (FIG. 2), a spindle 3, which can be actuated by a hydraulic or pneumatic jack, is caused to slide axially rearwards. The face of contact between spindle 3 and sliding member 4 forms a certain angle α with the axis of the chuck and the sliding member is thus pushed radially; in its turn, the sliding member pushes truncated sphere 10, the spherical surface of which is housed in a recess in arm 5 located to the rear of pivot joint 6, which causes arm 5 to pivot. Angle α can have any value, provided it is less than the angle as from which friction between spindle 3 and sliding member 4 would cause jamming.

At this stage, when all the jaws come to bear on the surface of piece 11, the latter generally undergoes adequate radial translation.

In the example illustrated, piece 11 has a groove 12, contained in a transverse plane, which will be used to effect optimum clamping, as explained by way of introduction. To accomplish this, the ends of the jaws are placed in the bottom of groove 12.

As shown in FIG. 3, this operation necessitates axial movement of arm 5, which results from the combination of the final actuation of spindle 3, the force of contact between jaw 8 and the surface of groove 12 and, finally, the return bias force of spring 7. We thus obtain a certain interval J between shoulder 13 and face F of pivot joint 6. The value of this interval J generally varies from one arm of the chuck to another, even if all the jaws are received in the same transverse groove, as said groove 12 is not perfectly contained in the theoretical transverse plane owing to imperfections in the making of piece 11. This axial movement of arm 5 is obtained according to the invention through a translation by an equal amount of truncated sphere 10 sliding over the plane surface of contact with sliding member 4, as can be seen from a careful comparison of FIGS. 2 and 3.

This ends the clamping operation according to the invention which, it should be emphasized, is carried out while constantly pressing piece 11 axially against its stops.

Once the machining of piece 11 has been completed, to release piece 11 and open the jaw carrier arms, spindle 3 is caused to slide axially forwards. Said member brings sliding member 4 back towards the axis of the chuck by means of a positive return device, for example a dovetail fit between spindle 3 and sliding member 4.

Figure 5:
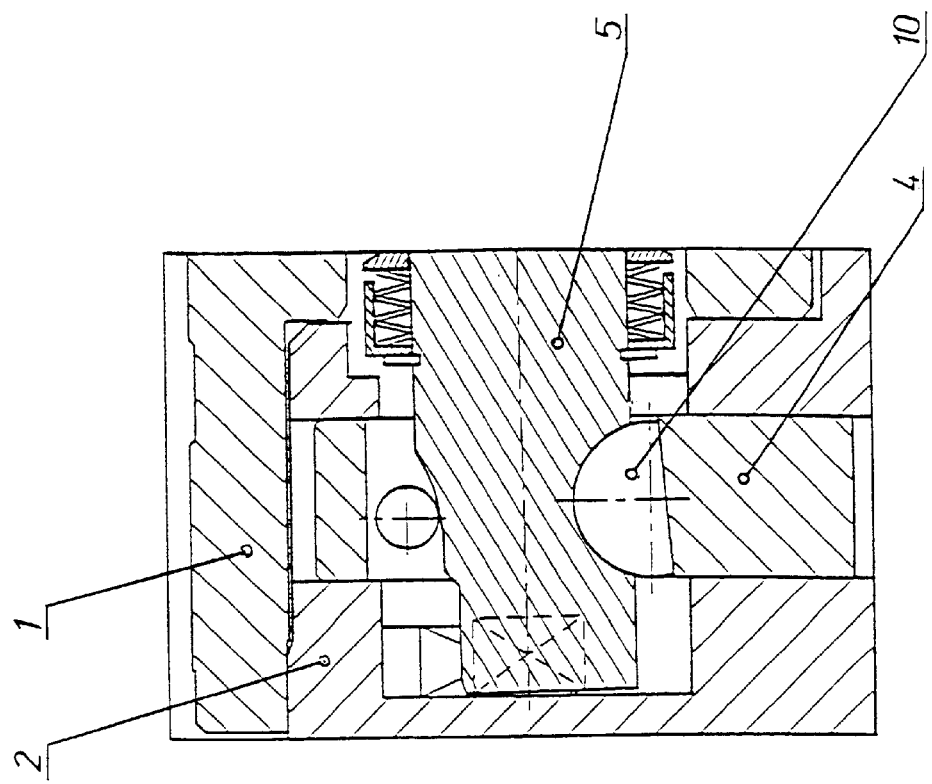
FIG. 5 is a longitudinal cross-section of the rear portion of a chuck according to a third form of embodiment.
Figure 4:
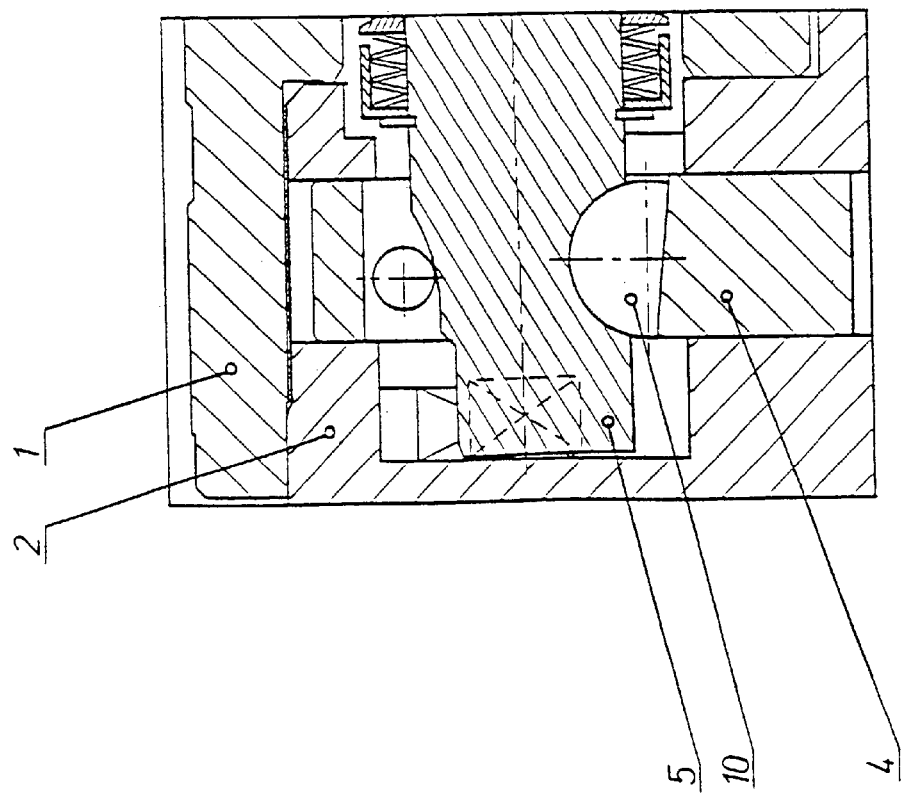
FIG. 4 is a longitudinal cross-section of the rear portion of a chuck according to a second form of embodiment.

In FIGS. 1 to 3, the plane face of contact between sphere 10 and sliding member 4 is oriented in such a way that the normal to this face is radial. Alternatively, a sliding member can be used such that the normal to the contact face is slightly inclined axially in relation to the strictly radial direction, either forwards (FIG. 4) or rearwards (FIG. 5). The advantage of these variants is that they enable the chuck to better withstand the stresses due to machining when the latter have a clearly determined axial direction, either rearward (FIG. 4) or forward (FIG. 5).

It will be advantageous to arrange the chuck according to the invention such that the jaws also benefit from a certain latitude of movement in the transverse direction, i.e., for each of them, in a direction perpendicular to the plane of FIGS. 1 to 5. This is accomplished by providing in plate 2 supporting the chuck, for each jaw carrier arm 5, a recess 14 having a width slightly greater than that of arm 5, as shown in FIG. 6 (the transverse movement of the rear of arm 5 is indicated by a double-headed arrow).

It will be readily appreciated that such a feature is very useful: for example, in the case of piece 11 shown in FIGS. 1 to 3, it has to be expected that owing, once again, to the imperfections in the making of the pieces, groove 12 will not be perfectly circular. Such deviations in relation to the design profile of the piece can thus be compensated for by a slight transverse displacement of the jaws (differing from one jaw to another), which will enable each of them to be perfectly placed at the intended point on the surface of the piece.

Figure 6:
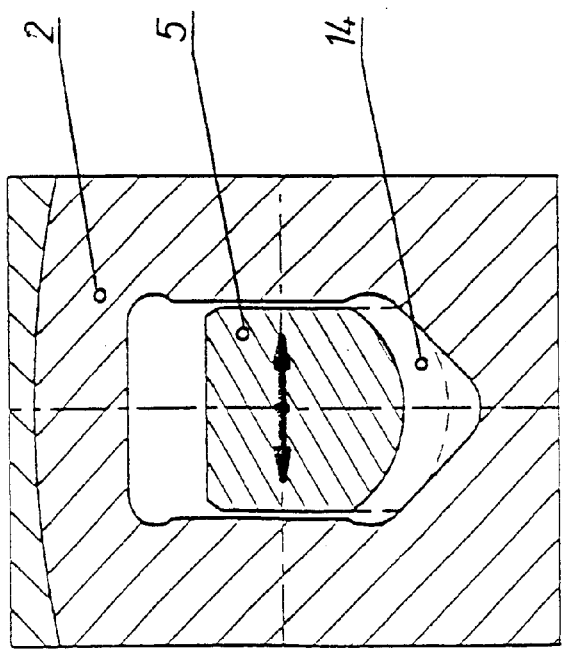
FIG. 6 is a back view of a transversely adaptative type jaw carrier arm, which can form part of any chuck according to the invention.

FIG. 6 shows that recess 14 has a "V"-shaped radial end on the side close to the axis of the chuck. It will be noted that the rear of arm 5 is received inside this "V" when the clamping device is in open position. Recess 14 has been arranged in this way so that, in said open position, arm 5 is automatically placed in a median position, transversely speaking, which is generally the most convenient condition to enable piece 11 to be loaded onto the chuck, or unloaded therefrom, without hitting the jaws.

Figure 7:
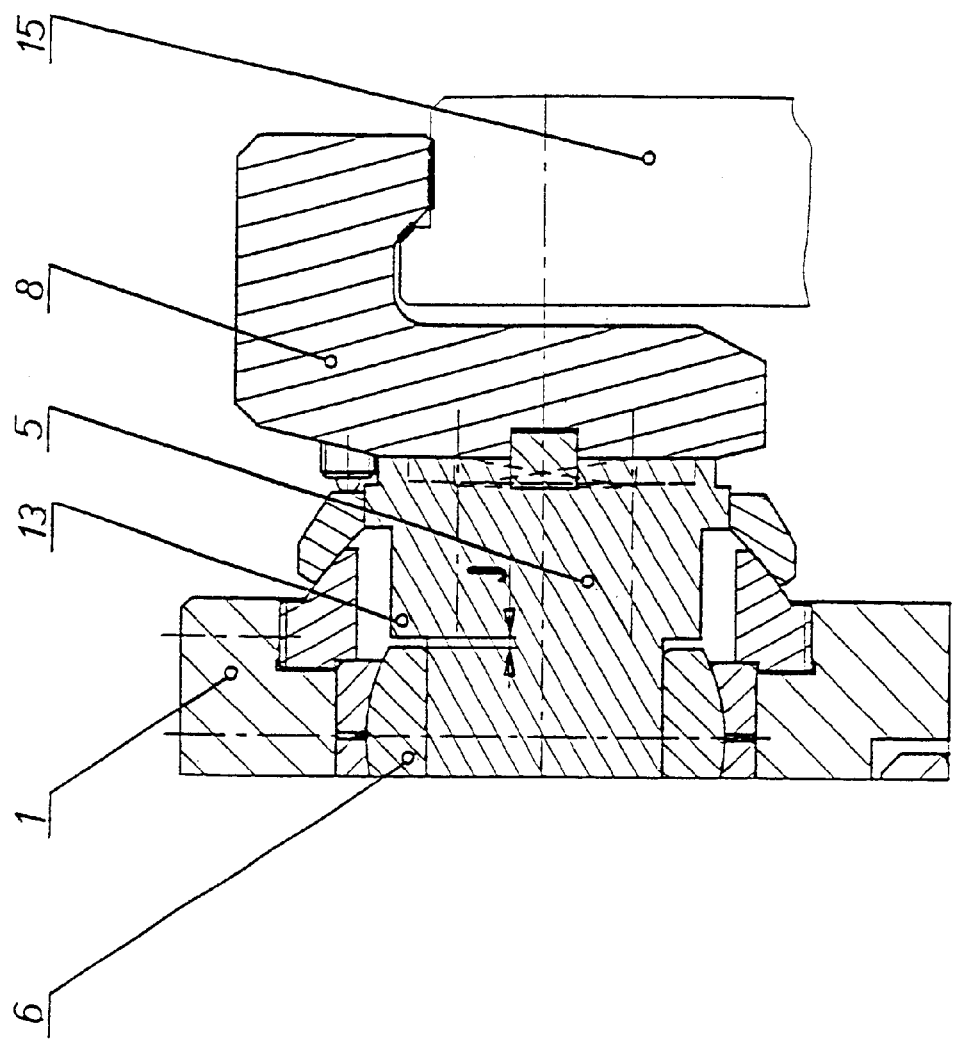
FIG. 7 is a longitudinal cross-section showing a jaw in its final position on a work piece having an axially symmetrical shoulder.

The forms of embodiment of the invention described above have been presented by way of example to illustrate the principles of the present invention, but it is quite clear that a person skilled in the art could use them to produce other variants without thereby departing from the scope of the invention. Similarly, the invention could be applied to a wide variety of work pieces other than the one described above, for example pieces having a shoulder symmetrical in relation to the axis of the chuck, such as piece 15 shown in FIG. 7.

What is claimed is:

1. A chuck including a plurality of jaws, each of which is fixed to the forward end of a jaw carrier arm, said arm being borne by a pivot joint mounted on the body of the chuck and the rotation of which imparts to the jaw an essentially radial movement, said rotation being controlled by radially displacing a sliding member pushing a truncated sphere housed between said sliding member and a recess provided in the arm to the rear of said pivot joint, wherein said truncated sphere is capable of sliding over the plane surface of contact with the sliding member, said jaw carrier arm then sliding in the pivot joint in an essentially axial direction, while being drawn rearwards by a return spring.

2. The chuck according to claim 1, wherein said plane face of contact between the sphere and the sliding member is oriented in such a way that the normal to this face is radial.

3. The chuck according to claim 1, wherein said plane face of contact between the sphere and the sliding member is oriented in such a way that the normal to said face is slightly inclined axially forwards in relation to a strictly radial direction.

4. The chuck according to claim 1, wherein said plane face of contact between the sphere and the slide is oriented in such a way that the normal to said face is slightly inclined axially rearwards in relation to a strictly radial direction.

5. The chuck according to claim 2, wherein the rear portion of the jaw carrier arm moves inside a recess provided in a plate on which the chuck is mounted and the width of which is slightly greater than that of said arm, so as to confer on the arm a certain latitude of movement in the transverse direction, so that the jaws can each come into contact with the work piece and adapt to its exact profile by subjecting the workpiece only to a radial translation, before final clamping of the work piece.

6. The chuck according to claim 5, wherein said recess has a "V"-shaped radial end on the side close to the axis of the chuck, in which the rear of the arm is received when the clamping device is in an open position, so as to center the arm automatically with respect to the transverse direction.

7. A chuck including a plurality of arms having respective forward ends arranged for respectively carrying a same plurality of jaws, each of the arms being slidably borne by a pivot joint mounted on a body of the chuck for allowing rotation of the jaw in a direction generally radial to a common axis of the chuck, under control of a device arranged for radially displacing a sliding member having a front contact surface, the front contact surface extending in a plane substantially parallel to the common axis, for pushing an opposed plane contact surface of a truncated sphere housed in a recess provided in a rear portion of the arm located rearward of the pivot joint, the opposed plane contact surface and the front contact surface allowing relative axial forward and rearward movements of the arm, the rearward movement of the arm under the action of a rearward biased return spring.

8. The chuck according to claim 7, wherein the device includes a spindle arranged for sliding axially on the body along the common axis, the spindle having a ramp slanted on the common axis, for pushing a back surface of the sliding member.

9. The chuck according to claim 7, wherein the front contact surface of the sliding member is slightly slanted forward in the axial direction for partly being turned towards the forward end.

10. The chuck according to claim 7, wherein the pivot joint is arranged for allowing a movement of the rear portion of the carrier arm in a transverse direction inside a recess provided in a plate supporting said body, said recess being slightly wider than the rear portion for limiting said transverse movement.

11. The chuck according to claim 10, wherein said recess is radially limited towards said common axis by a "V"-shaped side surface, for automatically centering said arm with respect to the transverse direction.

12. The chuck according to claim 7, wherein said body supports reference stops on a forward face, said reference stops receiving a workpiece in a predetermined axially abutting position before radially centering the workpiece by pivoting the arms to clamp the workpiece.

* * * * *